United States Patent [19]
Yamada et al.

[11] Patent Number: 5,708,205
[45] Date of Patent: Jan. 13, 1998

[54] MEASURING ELEMENT FOR A MASS AIR FLOW SENSOR AND MASS AIR FLOW SENSOR USING THE MEASURING ELEMENT

[75] Inventors: Masamichi Yamada, Hitachinaka; Kaoru Uchiyama, Ohmiya-machi; Izumi Watanabe, Hitachinaka; Tadashi Isono, Mito; Toshihiko Nakau, Sapporo, all of Japan

[73] Assignees: Hitachi, Ltd., Tokyo; Hitachi Car Engineering Co., Ltd., Ibaraki, both of Japan

[21] Appl. No.: 649,177

[22] Filed: May 17, 1996

[30] Foreign Application Priority Data

May 19, 1995 [JP] Japan .................. 7-121154

[51] Int. Cl.⁶ ........................... G01F 1/68
[52] U.S. Cl. ........................... 73/204.26
[58] Field of Search ..................... 73/204.26

[56] References Cited

U.S. PATENT DOCUMENTS

| 5,231,878 | 8/1993 | Zanini-Fisher et al. | 73/204.26 |
| 5,271,272 | 12/1993 | Hueftle et al. | 73/204.26 |
| 5,372,040 | 12/1994 | Hecht et al. | 73/204.26 |
| 5,375,466 | 12/1994 | Konzelmann | 73/204.26 |

FOREIGN PATENT DOCUMENTS

| A-62-821 | 1/1987 | Japan . |
| A-62-73124 | 4/1987 | Japan . |
| A-1-185416 | 7/1989 | Japan . |

*Primary Examiner*—Richard Chilcot
*Assistant Examiner*—Jewel V. Artis
*Attorney, Agent, or Firm*—Antonelli, Terry, Stout & Kraus, LLP.

[57] ABSTRACT

A measuring element for a mass air flow sensor formed on a substrate for measuring a flow rate of an objective fluid comprises a pair of heated resistors of thin films juxtaposed in the flowing direction of the objective fluid, formed at a thin film heated resistor forming part on the substrate, a pair of non-heated ambient temperature sensing resistors of thin films, formed at a thin film ambient temperature sensing resistor forming part on the substrate, and a plurality of electrode terminals of thin films formed at a supporting part at which the substrate is supported, being a part excluding the heated resistor thin film forming part and the thin film ambient temperature sensing resistor forming part, for taking out electrical signals from the heated resisters and the non-heated ambient temperature sensing resistors, wherein the thin film heated resistor forming part and the thin film ambient temperature sensing resistor forming part are shifted each other and arranged before and after in the flowing direction of the fluid, and shifted and arranged left and right in the direction perpendicular to the flowing direction so that the pair of the heated resistors and the pair of the non-heated do not superimpose each other in the viewing direction parallel to the flowing direction, and the supporting part is allocated at one end side of the substrate, at which the plurality of electrode terminals of thin films are formed.

9 Claims, 7 Drawing Sheets

MEASURING ELEMENT FOR A MASS AIR FLOW SENSOR AND MASS AIR FLOW SENSOR USING THE MEASURING ELEMENT

BACKGROUND OF THE INVENTION

The present invention relates to a measuring element for a mass air flow sensor, and more particularly to a measuring element for a mass air flow sensor for measuring an aspirated air flow rate in an internal combustion engine.

As an air flow sensor mounted in an electronic fuel management control system for an internal combustion engine in a vehicle, such as an automobile, a heated resistor type sensor is the most common, since such a sensor can directly detect a mass air flow rate. Examples of such a sensor are disclosed in JP-A-821/1987 and JP-A-73124/1987. The techniques disclosed in the above laid-open applications have a problem in that they have a high production cost, since the disclosed sensors have two heated resistor probes and two non-heated resistors used for compensating for the effects of ambient temperature (totally four resistors).

Further, a technique for producing four heated resistor probes using thin films formed on a substrate in order to decease the production cost has been proposed in JP-A-185416/1989.

However, the technique disclosed in JP-A-185416/1989 has the following problem that will be explained by referring to FIG. 8. FIG. 8 shows a plan view of an existing measuring element for a mass air flow sensor, which corresponds to FIG. 4 of the laid-open application. In the figure, the measuring element is composed of heated resistors 1 and 2, non-heated ambient temperature sensing resistors 3a and 3b, a substrate 4 made of electrically insulating material with a high thermal conductivity, such as a ceramic, electrode terminals 6 and a slit 10. In such a sensor, although the slit 10 is provided between the heated resistors 1 and 2 and the non-heated ambient temperature sensing resistors 3a and 3b, since both pairs of resistors come close each other and the substrate 4 of high thermal conductivity is joined at both end sides around the slit 10 in the substrate 4, the thermal insulation between both pairs of resistors is so insufficient that the heat easily flows from the heated resistors 1 and 2 to the non-heated ambient temperature sensing resistors 3a and 3b, which degrades the accuracy of measurement of air flow rate. In the figure, the numeral 7 indicates an air flow and the direction of the air flow.

The above-mentioned existing measuring element has a two-end side supporting structure in that electrical signals from the heated resistors 1 and 2 and the non-heated ambient temperature sensing resistors 3a and 3b are output from two groups of electrode terminals 6 provided at the opposite end sides of the substrate 4 (the right and left end sides shown in the figure), and each of the two groups of electrode terminals 6 is supported at each end and connected to an external circuit not shown in the figure. This structure has the problem that, since eight electrode terminals 6 are provided, the electrical connection of a circuit in the sensor becomes complicated, and the occupying percentage of the area occupied by the electrode terminals 6 with respect to the total area of the substrate 4 is large, which increases the production cost.

SUMMARY OF THE INVENTION

An objective of the present invention is to provide a measuring element of high accuracy and low production cost for a mass air flow sensor by improving the thermal insulation between a heated resistor and a non-heated resistor and by simplifying connections among circuit elements of the mass air flow sensor, including the resistors, and a further objective is to provide a mass air flow sensor using the measuring element.

The above objectives are attained by providing a measuring element for a mass air flow sensor formed on a substrate for measuring the flow rate of an objective fluid, comprising:

a pair of heated resistors formed of thin films juxtaposed in the flowing direction of the objective fluid to be measured and positioned at a thin film heated resistor forming part on the substrate;

a pair of non-heated ambient temperature sensing resistors formed of thin films positioned at a thin film ambient temperature sensing resistor forming part on the substrate; and a plurality of electrode terminals, formed of thin films located at a supporting part at which the substrate is supported, the supporting part being a part excluding the thin film heated resistor forming part and the thin film ambient temperature sensing resistor forming part, for outputting electrical signals from the heated resisters and the non-heated ambient temperature sensing resistors to a detection circuit;

wherein the thin film heated resistor forming part and the thin film ambient temperature sensing resistor forming part are shifted and arranged downstream and upstream from one another in the flowing direction of the fluid, and shifted and arranged on the left and the right in a direction perpendicular to the flowing direction so that the pair of heated resistors and the pair of non-heated ambient temperature sensing resistors are not superimposed on each other in the viewing direction parallel to the flowing direction; and the supporting part is disposed at one end of the substrate, at which the plurality of electrode terminals of thin films are formed, Further, it is preferable to provide a part of the substrate with a slit between the thin film heated resistor forming part and the thin film non-heated ambient temperature sensing resistor forming part which are shifted and arranged downstream and upstream in the flowing direction and on the left and the right in the direction perpendicular to the flow direction.

Further, the mass air flow sensor preferably has a common electrode terminal commonly connected to a pair comprising a heated resistor and a non-heated ambient temperature sensing resistor, and another common electrode terminal commonly connected to a pair comprising another heated resistor and another non-heated ambient temperature sensing resistor.

Furthermore, it is preferable to form the heated resistors and the non-heated ambient temperature sensing resistors by using the same material and the same production process under the same processing conditions.

By shifting and arranging the thin film heated resistor forming part and the thin film non-heated ambient temperature sensing resistor forming part downstream and upstream in the air flowing direction, and on the left and the right in a direction perpendicular to the flow direction, since the heated and non-heated resistors can be thermally more strongly separated as compared with the existing sensors, the thermal insulation between the heated and the non-heated resistors becomes more effective and the thermal effects of the heated resistors on the non-heated resistors are almost completely avoided, which improves the measurement accuracy. Especially, the provision of a part of the substrate with a slit between the heated and non-heated resistors improves the thermal insulating effects as well as the measurement accuracy.

Since a plurality of electrode terminals are collected and arranged at one side of the substrate, and some of the electrode terminals are commonly connected to a pair comprising a heated resistor and a non-heated resistor, an electrical connection between the measuring element for the mass air flow sensor and an external circuit is simplified, which causes a decrease in the production cost of the air flow sensors.

DETAILED DESCRIPTION OF THE EMBODIMENTS

Figure 1:
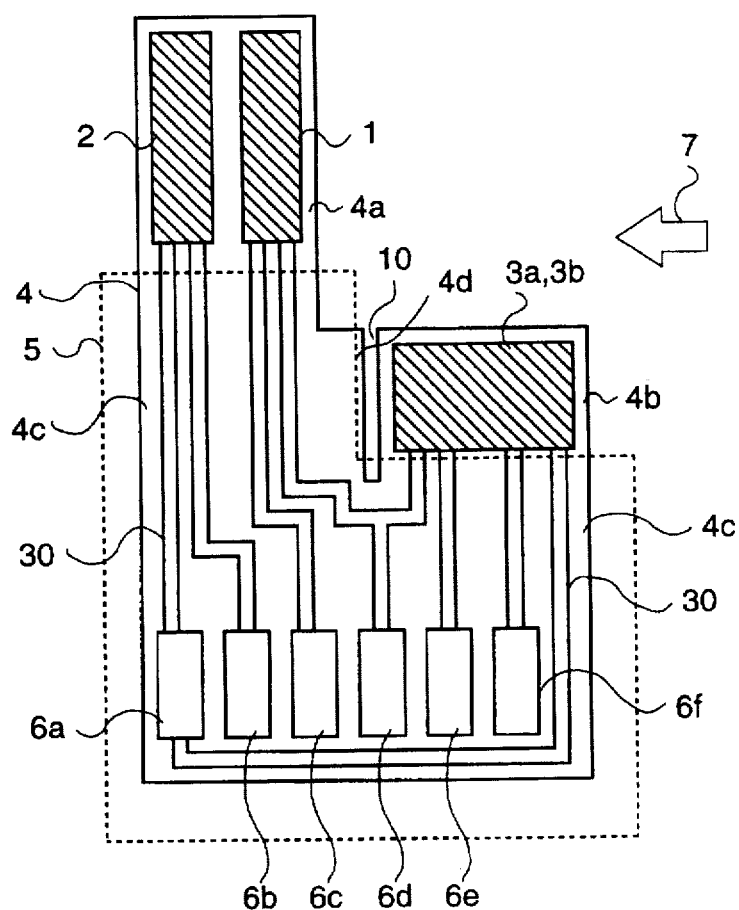
FIG. 1 shows a plan view of a mass air flow sensor representing an embodiment of the present invention.

Hereinafter, details of the present invention will be explained with reference to various embodiments, by referring to the drawings.

FIG. 1 is a plan view of a measuring element for a mass air flow sensor forming an embodiment of the present invention. The measuring element for the mass air flow sensor is composed of a substrate 4, heated resistors 1 and 2 formed and arranged in a downstream portion of an air flow 7, non-heated ambient temperature sensing resistors 3a and 3b formed and arranged in an upstream portion of the air flow 7, electrode terminals 6a, 6b, 6c, 6d, 6e and 6f for taking out electrical signals from the heated resistors and the non-heated ambient temperature sensing resistors, and a plurality of lead wires 30 electrically connecting the heated resistors, the non-heated ambient temperature sensing resistors and the electrode terminals.

The substrate 4 includes a thin film heated resistor forming part 4a on which the heated resistors 1 and 2 are formed, a thin film non-heated ambient temperature sensing resistor forming part 4b on which the non-heated ambient temperature sensing resistors 3a and 3b are formed, a supporting part 4c separating the heated resistor forming part 4a from the non-heated resistor forming part 4b of the substrate 4, at which the substrate 4 is supported, and a part having a slit 10. Now, the dashed line in FIG. 1 shows an outline of an example of a supporting member 5 for supporting the substrate 4.

Further, the thin film heated resistor forming part 4a, at which the heated resistors 1 and 2 are formed, and the thin film non-heated ambient temperature sensing resistor forming part 4b, at which the non-heated resistors 3a and 3b are formed, are shifted with respect to each other and arranged downstream and upstream in the air flowing direction, and on the left and the right in a direction perpendicular to the air flow direction. That is, the positional relationship between the heated resistor forming part 4a and the non-heated resistor forming parts 4b is set so that the two parts are shifted with respect to each other and arranged before and after, and on the left and the right, with respect to the direction of an air flow 7. For example, if the thin film heated resistor forming part 4a is relatively arranged downstream in the air flow direction and on the left in the direction perpendicular to the air flow direction, the thin film non-heated resistor forming part 4b is relatively arranged upstream in the air flow direction and on the right in the direction perpendicular to the air flow direction. The above-mentioned resistor arrangement is devised for preventing the two resistor forming parts from being superimposed with respect to each other in the direction of view parallel to the air flow direction, and for separating the heated resistors 1 and 2 and the non-heated resistors 3a and 3b as far as possible, in order to improve the thermal insulation between the heated and the non-heated resistors.

Further, a slit 10 is provided in the substrate between the thin film heated resistor forming part 4a and the thin film non-heated ambient temperature sensing resistor forming part 4b, which are shifted with respect to each other and offset on the substrate 4. Since the slit 10 further thermally separates the heated resistors 1 and 2 and the non-heated resistors 3a and 3b, the thermal insulation is further improved, and a reverse air flow heated by the heated resistors 1 and 2 in a reverse air flow condition does not subject the non-heated resistors 3a and 3b to a thermal effect, which makes it possible to measure the mass air flow rate with a higher accuracy.

In this case, single the generated heat in the heated resistors 1 and 2 flows to the supporting member 5 (the part enclosed by the dashed line shown in the figure) via the substrate 4 by extending a side of the slit 10 in the downstream direction of the air flow to the side 40 of the supporting member 5, the thermal influence of the heated resistors 1 and 2 on the non-heated resistors 3a and 3b can be largely reduced and the measurement accuracy is further improved. This improvement results from the fact that heat conduction via the periphery of the substrate is prevented, since the route of the heat conduction is intercepted by the slit 10.

Furthermore, it is desirable to extend the slit 10 beyond the side 40 of the supporting member 5 into the inner area of the supporting member 5 as shown in FIG. 1, from the point of view of increasing the strength against breaking of the substrate 4 starting from the slit 10, due to the heat conduction to the supporting member 5.

Further, it is also possible to provide the substrate with a non-heated part 4d at an upstream side edge part which is not supported by the supporting member and is exposed to the air flow with such a structure, the heated resistors 1 and 2 are cooled by the air flow and the thermal effects on the non-heated resistors 3a and 3b can be reduced, and the change of the temperature of the heated resistors caused when the operation state changes from a low-speed air flow state to a high-speed air flow state is small, due to the part exposed in the air flow. Thus, since the heat from the heated resistors conducted in the root part direction of the substrate 4 can be reduced, the time needed until equilibrium of the temperature distribution is attained in the substrate is decreased, which improves the characteristics of transient responses to quick changes of the air flow.

The substrate 4 on which the resistors 1, 2, 3a and 3b, and the electrode terminals 6a–6f, are formed is mechanically supported by the supporting member 5, and further, only one side of the substrate 4 is supported so that the electrode terminals 6a–6e formed at the one side can be electrically connected to an external circuit not shown in the figure. Then, when the measuring element for the mass air flow sensor is mounted in an engine, the substrate 4 is supported at the supporting part 4c on the supporting member 5.

And, the supporting part 4c is located at one side of the substrate in the direction perpendicular to the air flow direction, and the plurality of electrode terminals 6a–6f are formed on a part of the supporting part 4c. Therefore, the connection of the electrode terminals to the external circuit has only to be carried out in the one direction, in such one side supporting structure, which results in a simplification of the electrical connection.

Figure 2A:
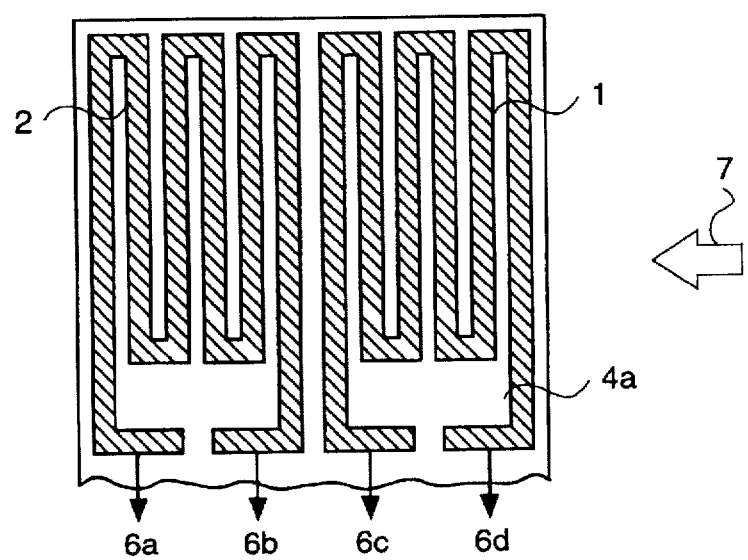
FIGS. 2a–2d show enlarged views of examples of thin film patterns for a pair of the heated resistors shown in FIG. 1.

FIG. 2a through FIG. 2d show enlarged views of examples of thin film patterns for a pair of heated resistors in the embodiment of FIG. 1. FIG. 3a and FIG. 3b show enlarged views of examples of thin film patterns for a pair of non-heated ambient temperature sensing resistors in the embodiment of FIG. 1. In FIG. 2a, a pair of heated resistors 1 and 2 are juxtaposed in the flow direction of the air flow 7 to be measured and are formed at the thin film heated resistor forming part 4a, are shown, and in FIG. 3a, a pair of the non-heated ambient temperature sensing resistors 3a and 3b juxtaposed in the flow direction of the air flow 7 to be measured and are formed at the thin film non-heated ambient temperature resistor forming part 4b.

Therefore, the composition of the measuring element for the mass air flow sensor of the present invention has the following features, that is, the measuring element for the mass air flow sensor formed on a substrate comprises:
- a pair of heated resistors formed of thin films juxtaposed in the flowing direction of the objective fluid and formed at a thin film heated resistor forming part on the substrate;
- a pair of non-heated ambient temperature sensing resistors formed of thin films positioned at a thin film ambient temperature sensing resistor forming part on the substrate; and
- a plurality of electrode terminals, formed of thin films disposed on a supporting part at which the substrate is supported, representing a part excluding the thin film heated resistor forming part and the thin film ambient temperature sensing resistor forming part, for outputting electrical signals from the heated resisters and the non-heated ambient temperature sensing resistors to a detection circuit;
wherein the thin film heated resistor forming part and the thin film ambient temperature sensing resistor forming part are shifted and arranged before and after one another in the flowing direction of the fluid, and shifted and arranged on the left and the right in a direction perpendicular to the flowing direction, so that the pair of heated resistors and the pair of non-heated resistors are not superimposed with respect to each other in the viewing direction parallel to the flowing direction; and
the supporting part is disposed at one end of the substrate, at which the plurality of electrode terminals of thin film are formed.

Figure 2B:
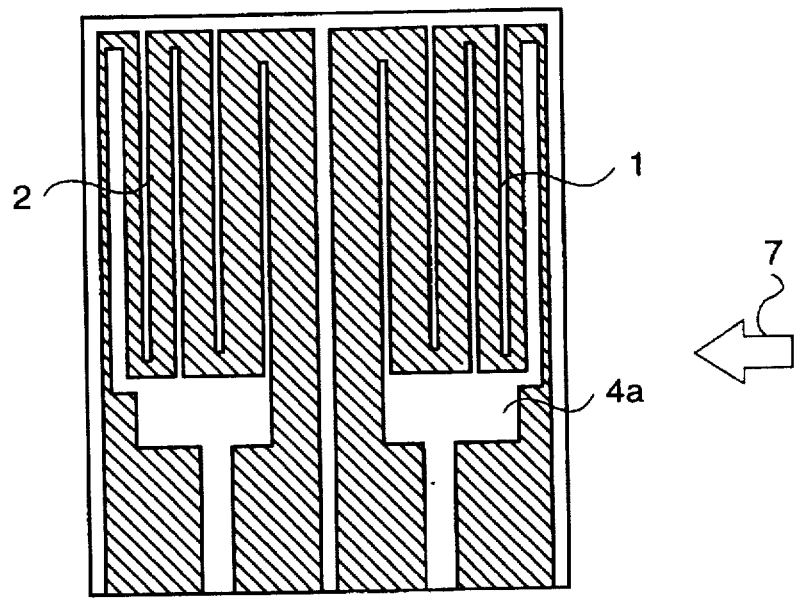
Figure 2C:
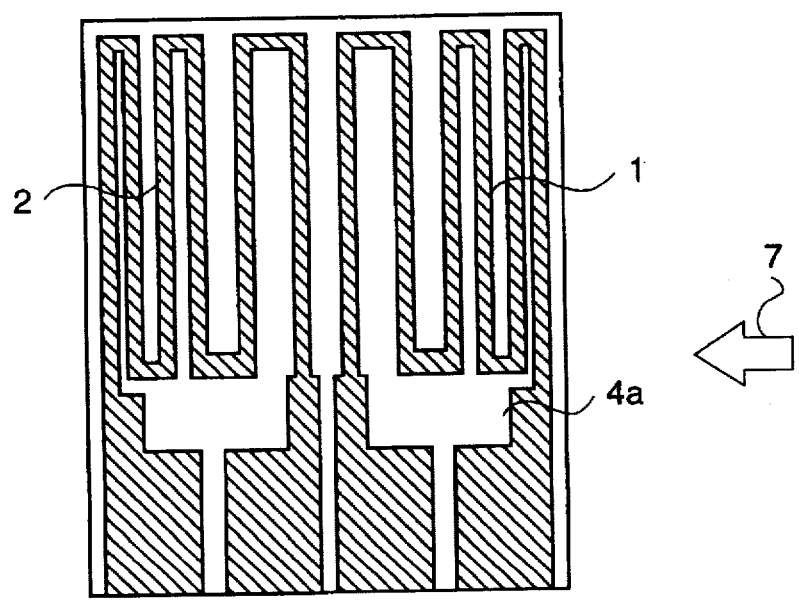
Figure 2D:
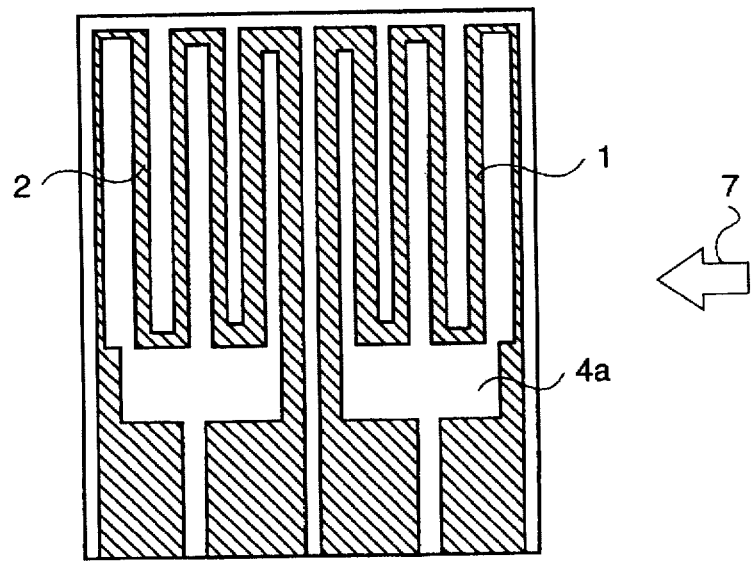
Figure 3A:
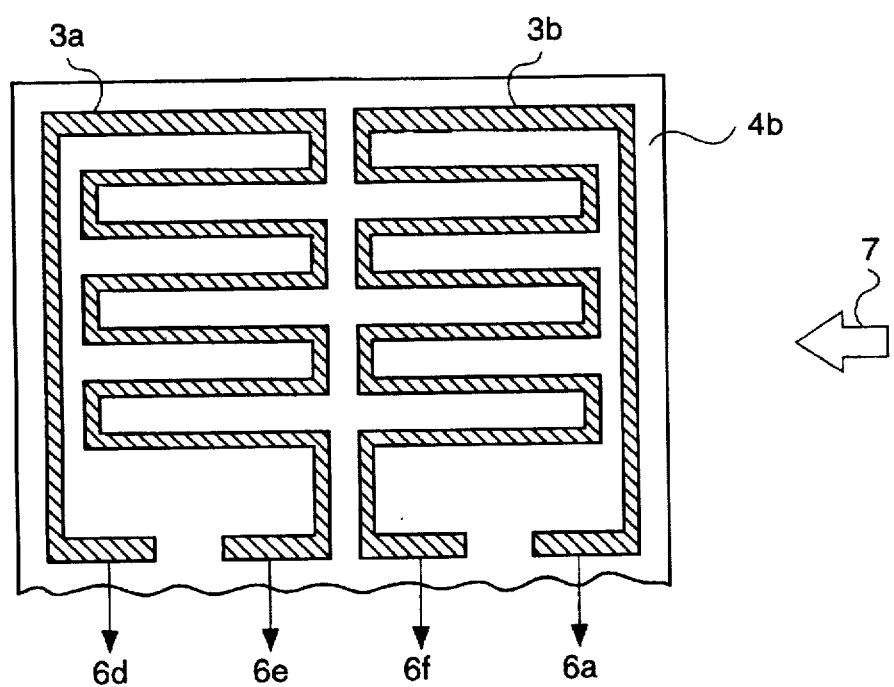
FIGS. 3a and 3b show enlarged views of examples of thin film patterns for a pair of the non-heated ambient temperature sensing resistors shown in FIG. 1.
Figure 3B:
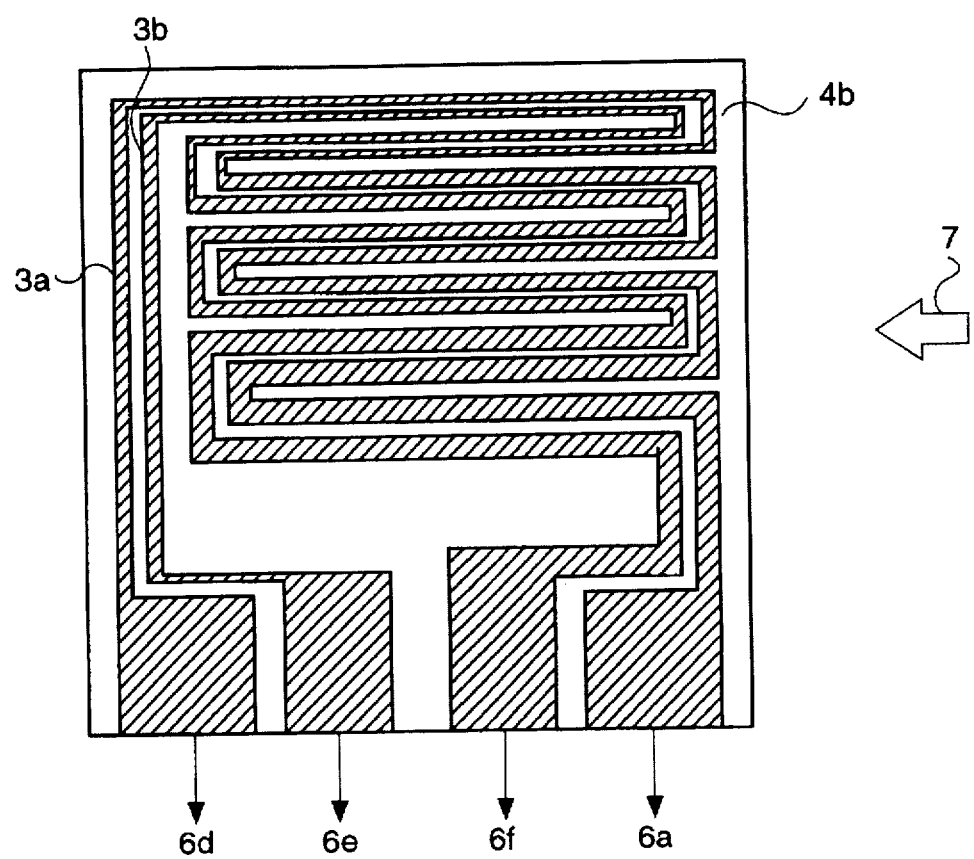

As a pattern of the thin film heated resistors 1 and 2, further patterns, as shown in FIGS. 2b, 2c and 2d, are available.

In FIG. 2b, the width of each stripe in the resistor patterns becomes narrower and the line species density intersecting a unit length in the flow direction, of the stripe, increases, as the stripe approaches each side of the substrate 4. In FIG. 2c, the width of each stripe in the resistor patterns is constant and arranged so that the interval between two neighboring lines of the stripe drawn in the direction perpendicular to the low direction becomes narrower as the stripe approaches each side of the substrate 4. And, in FIG. 2d, the interval between two neighboring lines of the stripe drawn in the direction perpendicular to the flow direction is constant and arranged so that the width of each stripe becomes narrower as the stripe approaches each side of the substrate 4. Thus, each pattern is composed so that the nearer to each side the substrate 4 a part of the pattern is, the larger the resistance value per unit area of the pattern becomes.

As mentioned above, by juxtaposing at least two heated resistors, each formed of a thin film and having a temperature dependent resistance, in the flow direction on an almost plane substrate provided in an air intake pipe of an engine, and by configuring the patterns of the thin film resistors so that the nearer to the center line between the pair of the resistors a part of each pattern is, the smaller the resistance value per a unit area of the pattern becomes, a forward air flow rate can be quickly measured by the heated resistor arranged upstream in the air flow, and a reverse air flow rate can be also quickly measured by the heated resistor arranged downstream in the air flow, so that it becomes possible to provide a mass air flow sensor capable of quickly detecting the flow rate of intake air with a high accuracy, in both the directions of a forward flow and a reverse flow.

A pattern of the thin film non-heated resistors 3a and 3b, as shown in FIG. 3b, is also available. In FIG. 3b, the non-heated ambient temperature sensing resistors 3a and 3b are composed of two thin film resistors and are formed so that the pair of thin film patterns are drawn around together and formed in the same shape and so that the resistance value per a unit area of a part of the patterns increases as the part approaches the top side of the substrate 4.

Since the resistance value of the resistors becomes larger at the sides of the substrate 4 to which the air flow strikes, by configuring the patterns of the thin film resistors as shown in FIGS. 2b, 3c and 2d and FIG. 3b, the air flow rate can be quickly measured with a high accuracy, and so, a signal representing almost the true air flow rate can be obtained.

The substrate 4 is made of a ceramic, such as alumina, and is formed of a very thin plate having a thickness of 0.05 mm to 0.15 mm in order to increase the response speed. The heated resistors 1 and 2 and the non-heated ambient temperature sensing resistors 3a and 3b are made of a platinum thin film and are formed together on the substrate 4 with a thickness of 0.1µ to 2µ by a thin film forming method such as sputtering, evaporation, etc. After forming the thin films, the films are processed in such shapes as shown in FIG. 2a to FIG. 3b. The term "formed together" "means formed to the same thickness by using the same material and by the same processing method under the same producing conditions". That is, in the embodiment shown in FIG. 1, the heated resistors 1 and 2 and the non-heated ambient temperature sensing resistors 3a and 3b are formed to the same thickness by using the same material and by the same processing method under the same producing conditions. By the above-mentioned producing method, since the thermal coefficients of the electrical resistance of the heated resistors 1 and 2 and the non-heated ambient temperature sensing resistors 3a and 3b become equal, variations of the thermal characteristics among the resistors can be suppressed, which also improves the measurement accuracy.

Further, the lead wires 30 and the electrode terminals 6a, 6b, 6c, 6d, 6e and 6f for connecting the heated resistors 1 and 2, and the non-heated ambient temperature sensing resistors 3a and 3b, are made of a thick film, which is thicker than the thickness of the platinum film forming the resistors 1, 2, 3a and 3b, of platinum-silver alloy, in order to decrease the electrical resistance, which resistors are formed on the platinum film by a film forming method, such as printing, etc. And, a protective film (not shown in the figure) made of alumina, silicon dioxide, glass, etc. is formed on the resistors 1, 2, 3a and 3b. Further, the slit 10 is formed by a processing method such as a laser machining method.

Figure 4:
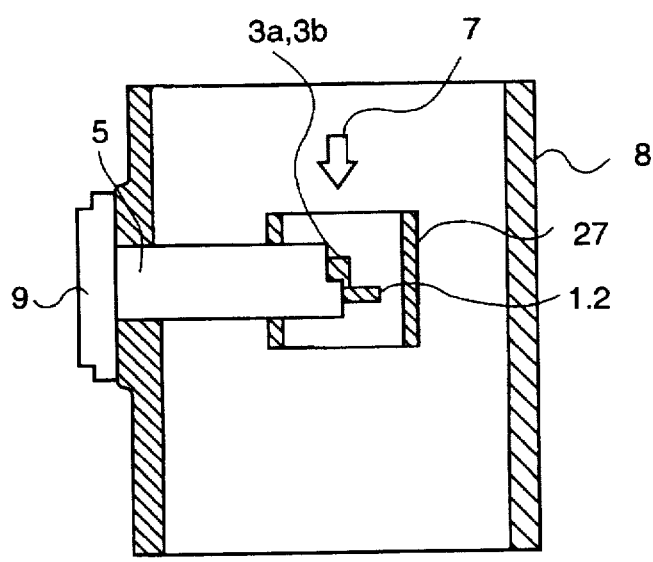
FIG. 4 shows a cross-sectional view of an example in which the measuring element for the mass air flow sensor shown in FIG. 1 is mounted.

FIG. 4 shows a cross-sectional view of an example of the mounting of the measuring element for the mass air flow sensor, shown in FIG. 1, in an engine. For example, the figure is a cross-sectional view of the mounting of the mass air flow sensor in an air intake pipe of an internal combustion engine. As shown in FIG. 4, the mass air flow sensor comprises the resistors 1, 2, 3a and 3b, the supporting member 5, the external circuit 9, and the resistors 1, 2, 3a and 3b are disposed within a sub-tube 27 provided in the air intake pipe 8. The external circuit 9 is connected to the resistors 1, 2, 3a and 3b on the substrate 4 supported by the supporting member 5.

Figure 5:
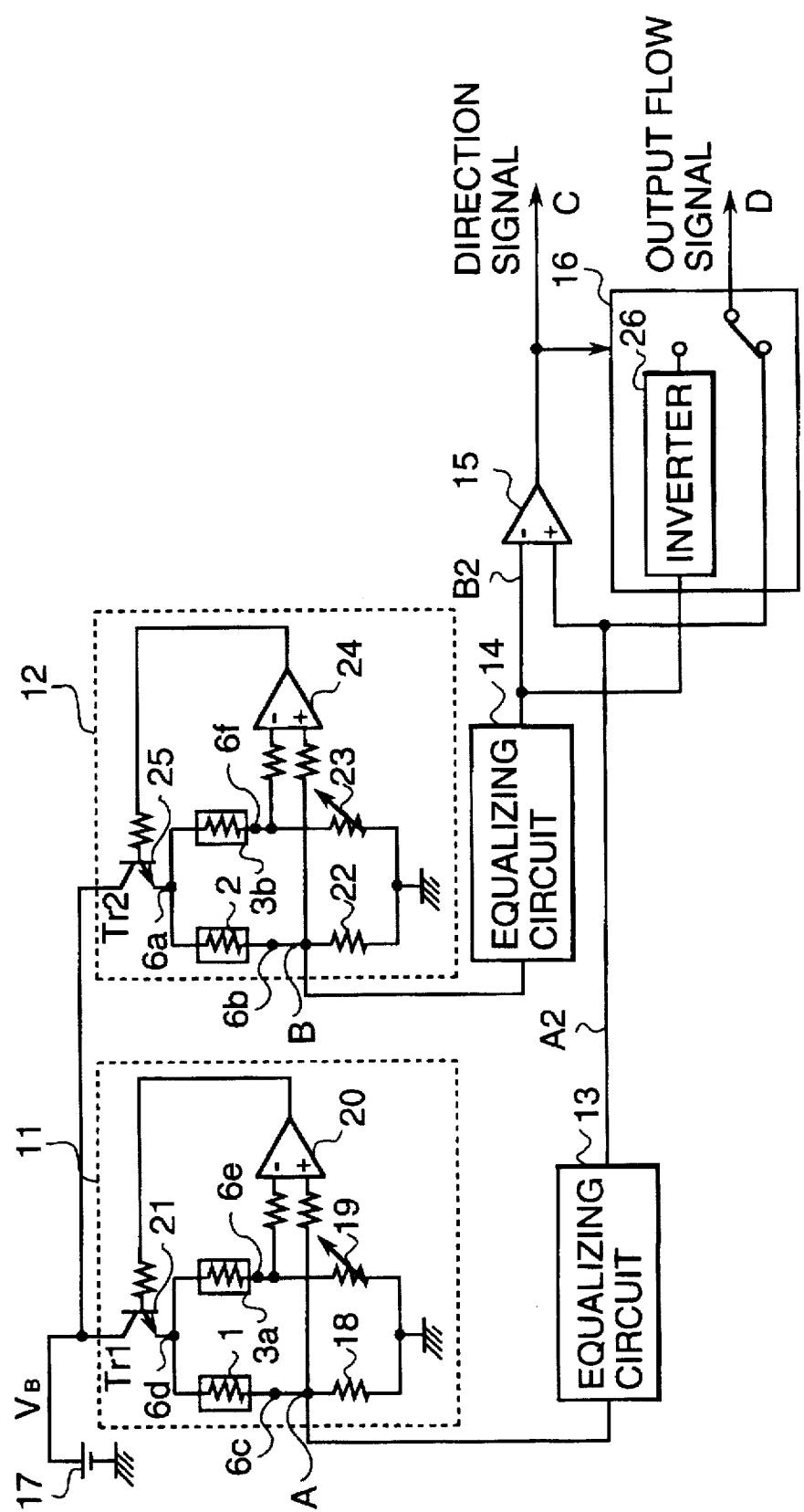
FIG. 5 is a schematic diagram of an electric circuit including an external circuit 9 and the resistors 1, 2, 3a and 3b.

FIG. 5 shows an electrical circuit including the external circuit 9 and the resistors 1, 2, 3a and 3b. In the following, operations of an embodiment of the present invention will be explained by referring to FIG. 5. Each of the heated resistor driving circuits 11 and 12 is an independent circuit connected to a source 17, and outputs a signal corresponding to the air flow rate. In the heated resistor driving circuit 11, a balanced bridge circuit is composed of the heated resistor 1, the non-heated ambient temperature sensing resistor 3a and the resistors 18 and 19, and the current flowing in the heated resistor 1 is adjusted by a differential amplifier 20 and a transistor 21 so that the difference between the potentials at the middle points always becomes 0. In the heated resistor driving circuit 11, the resistance value of the heated resistor 1 is kept constant, that is, the temperature of the heated resistor 1 is kept constant by varying the current through the heated resistor 1 with variation of the speed of the air flow.

Then, a signal corresponding to the speed of the air flow output from the heated resistor 1 is obtained from the potential at the middle point A shown in FIG. 5. The composition of the heated resistor driving circuit 12 is the same as the composition of the circuit 11, and the signal corresponding to the speed of the air flow output from the heated resistor 2 indicates the potential at the middle point B shown in the figure. The heated resistors 1 and 2 are arranged in the air intake pipe of an engine in a vehicle, such as an automobile, in which, for example, the heated resistor 1 is located upstream in the air flow and the heated resistor 2 is located adjacent the heated resistor 1 downstream in the air flow, as shown in FIGS. 2a–2d. The heated resistors 1 and 2 are heated by the heated resistor driving circuits 11 and 12 so that the difference between the air temperature (ambient temperature) and the temperature of each heated resistor driving circuit is kept constant, independently of the speed of the air flow, similar to the usual constant temperature type air mass flow sensor.

At first, when the air flows in the forward direction from upstream to downstream in the air intake pipe, the heat generated in the heated resistor 1 by the heated resistor driving circuit 11 is larger than the heat generated in the heated resistor 2, since the heated resistor 1 is cooled more than the heated resistor 2. On the other hand, when the air flows in the reverse direction from downstream to upstream in the air intake pipe, the heat generated in the heated resistor 2 by the heated resistor driving circuit 12 is larger than the heat generated in the heated resistor 1, since the heated resistor 2 is cooled more than the heated resistor 1.

Therefore, the direction of the air flow can be detected based on the difference between the amounts of the currents fed to the heated resistors 1 and 2. Equalizing circuits 13 and 14 electrically improve the frequency response characteristics of the output signals from the heated resistors 1 and 2, corresponding to the air flow rate. Further, the direction of the air flow is detected based on the difference between the output signals from the equalizing circuits 13 and 14, obtained by a voltage comparator 15, and the flow rate signal, of which an error caused by the reverse flow effects is small, is obtained by selecting a signal to be output between the two output signals from the equalizing circuits 13 and 14, using a switching circuit 16.

Figure 6A:
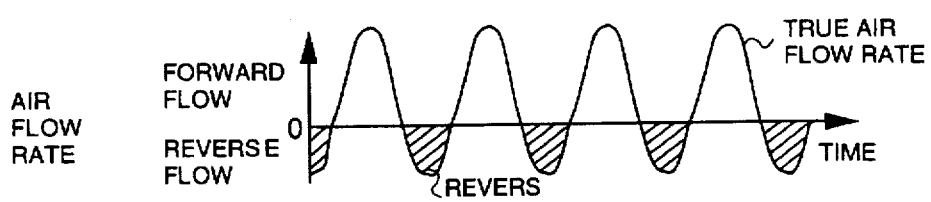
FIGS. 6a–6g are graphs for showing the operation of the mass air flow sensor.
Figure 6B:

Next, operations of the mass air flow sensor will be explained by referring to FIGS. 6a–6g. A signal from the heated resistor is shown by converting the electrical signal to a mass air flow rate. Generally, the pulsation amplitudes of the air flow rate are large during operations of low revolution number and during heavy load operation of an engine having not more than four cylinders, and changes in the air flow rate are represented by a wave having an almost sine waveform, including reverse flows of negative air flow rates, as shown in FIG. 6a. For example, in the case where the revolution number of a shaft in an engine is 1000 rpm, the frequency of the pulsation in the air flow is about 33 Hz. The waveform of the air flow rate depends on the shapes of the combustion chamber, the intake pipe, the exhaust pipe and the air cleaner. When a pulsating flow containing a reverse flow is measured by an ideal heated resistor sensor with quick response characteristics, a positive signal corresponding to the absolute value of the sensed speed of the air flow is output from the ideal sensors, independently of the forward or reverse direction of the air flow, as shown in FIG. 6b.

Figure 6C:
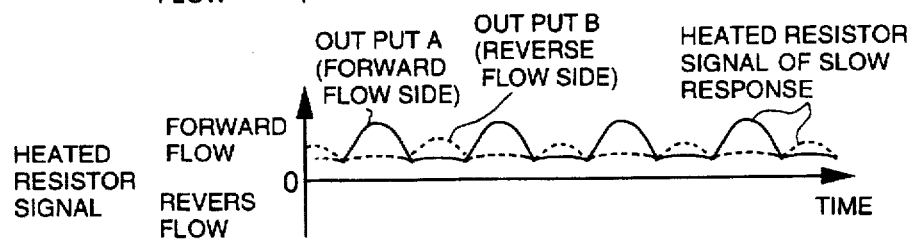
Figure 6D:
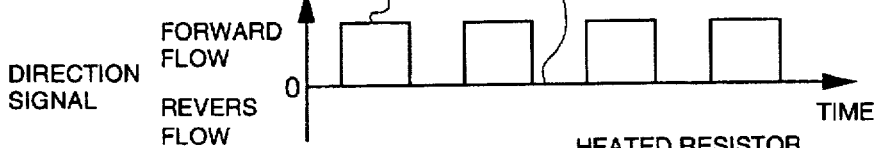
Figure 6E:
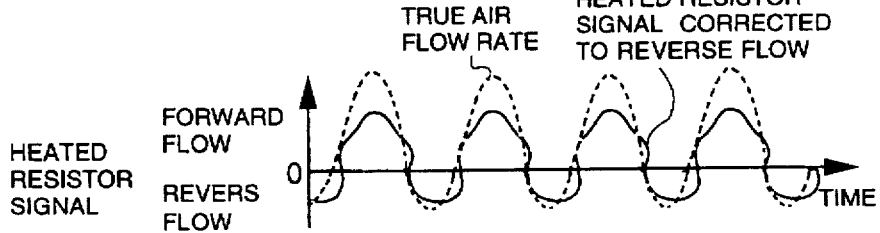

However, since a signal output from an actual heated resistor sensor has a response delay as shown in FIG. 6c, the signal does not become 0 at the switching point between the forward and the reverse flows. And, a signal A output from the heated resistor 1 arranged upstream in the intake air flow has a large forward flow and a small reverse flow. Conversely, a signal B output from the heated resistor 2 arranged downstream in the intake air flow has a small forward flow and a large reverse flow. The voltage comparator 15 taking in the above two signals outputs alternatingly a level-high signal (Hi) corresponding to the forward flow and a level-low signal (Low) corresponding to the reverse flow, as shown in FIG. 6d. The reverse flow correction is executed for the output signals of the heated resistors by inverting a sign of the output signal of the heated resistor 2 with the switching circuit 16 based on the direction signal output from the voltage comparator 15, and so a waveform of the air flow rate as shown in FIG. 6e containing a reverse flow component can be synthesized.

Figure 6F:
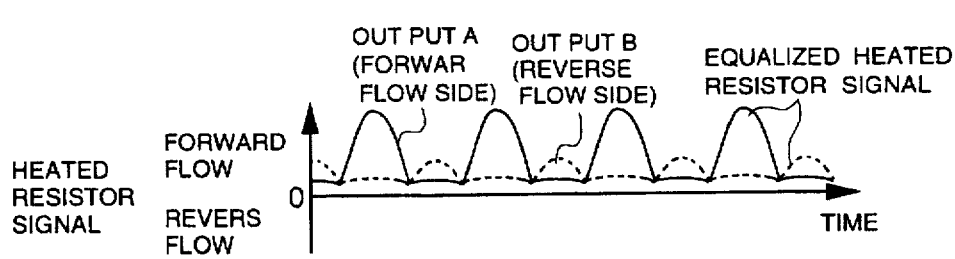
Figure 6G:
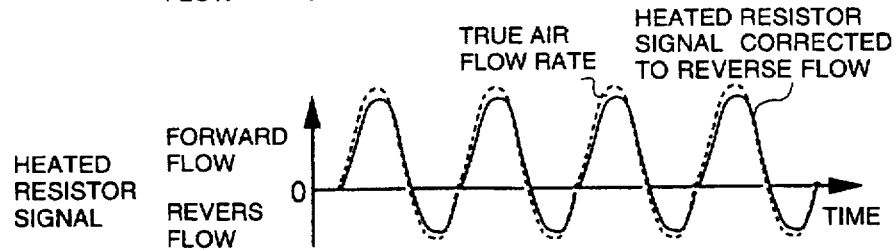
Figure 7:
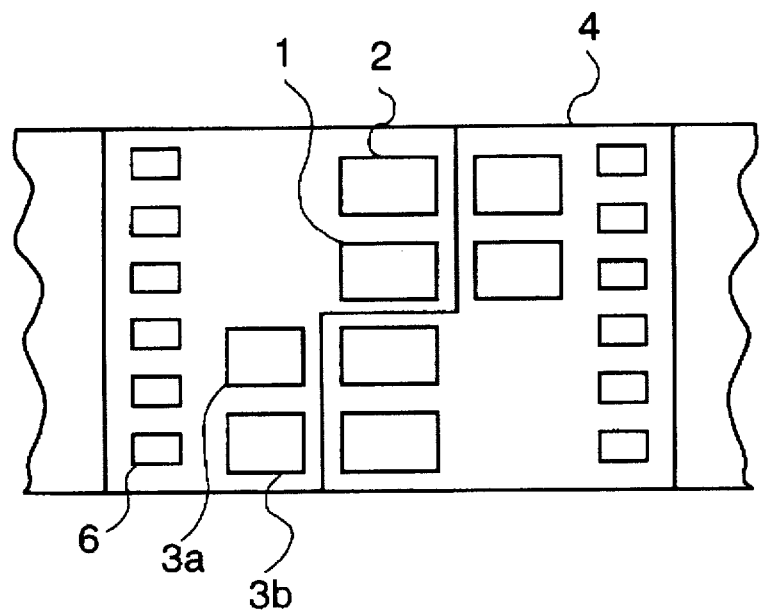
FIG. 7 is a diagram of an example of an arrangement of thin film elements formed in each measuring element chip wafer.
Figure 8:
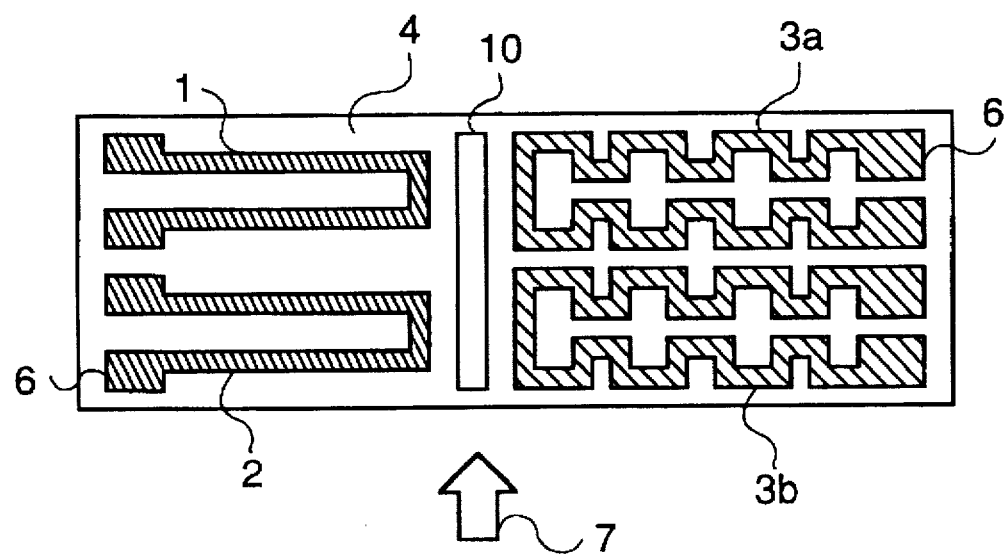
FIG. 8 is a plan view of an existing measuring element for a mass air flow sensor.

However, since the phase of the above-mentioned synthesized waveform of the air flow rate is shifted as compared with the true air flow rate, and jumping points of the flow rate at the 0 level of the air flow rate are generated in the synthesized wave form, the average level of the synthesized waveform has an error as compared with the average level of the true air flow rate. Therefore, by applying the equalizing operation of circuits 13 and 14 to the signals output from the heated resistors 1 and 2, the time delays in the signals output from the heated resistors 1 and 2 can be recovered, and so, signals as shown in FIG. 6f are obtained. The signals A1 and B1 from the two heated resistors, of which the time delays are recovered by using the equalizing circuits 13 and 14, receive a reverse flow correction and are synthesized into a signal of the air flow rate which is almost equal to the true air flow rate. And, any error in the average flow rate level obtained by using the improved synthesized signal of the air flow rate can be remarkably decreased.

In accordance with in the present invention, a sensor is provided which has a structure such that only one side of the substrate 4 is supported, and the common electrode terminals 6a and 6c are formed for the connection points of the balanced bridge circuit shown in FIG. 5. As shown in FIG. 1, the heated resistor 2 and the non-heated ambient temperature sensing resistor 3b are commonly connected to the common electrode terminal 6a, and the heated resistor 1 and the non-heated ambient temperature sensing resistor 3a are commonly connected to the common electrode terminal 6d.

Thus, the number of electrode terminals can be reduced from eight in existing sensors to six in the sensor of the present invention by providing the two common electrode terminals, that is, one is the electrode terminal 6a commonly used for connecting the heated resistor 2 and the non-heated ambient temperature sensing resistor 3b, and the other is the electrode terminal 6d commonly used for connecting the heated resistor 1 and the non-heated ambient temperature sensing resistor 3a. By providing the common electrode terminals and adopting the structure of supporting the substrate at one side of the substrate, the connection of the external circuit 9 and the measuring element for the mass air flow sensor can be simplified. Thus, since the fraction of the area occupied by the electrode terminals to the whole area of the substrate 4 can be reduced, the number of thin film parts capable of being provided in a measuring element chip formed on a wafer increases, which can reduce the production cost of the sensor.

Although the equalizing circuits are employed in the embodiment of FIG. 5, the use of an equalizing circuit is not always necessary if a resistor element having a sufficiently quick response characteristic is used. Further, although the non-heated ambient temperature sensing resistors 3a and 3b are arranged upstream of the heated resistors 1 and 2 in the disclosed embodiment, it is also possible to arrange the non-heated resistors 3a and 3b downstream of the heated resistors 1 and 2, since the non-heated resisters 3a and 3b and the heated resistors 1 and 2 are shifted with respect to each other to the left and right in the direction perpendicular to the air flow direction.

In accordance with the present invention, since the heat flowing from the heated resistors to the non-heated resistors is effectively insulated, and the electrical connection between the external circuit and the measuring element for the mass air flow sensor is simplified by providing common electrode terminals, to each of which a pair of the heated resistor and the non-heated ambient temperature sensing resistor are commonly connected, it is possible to provide a measuring element for a mass air flow sensor having a high measurement accuracy and a low production cost.

What is claimed is:

1. A measuring element for a mass air flow sensor formed on a substrate, comprising:

at least a pair of heated thin film resistors juxtaposed in the direction of an air flow and formed at a thin film heated resistor forming part on said substrate;

at least a pair of non-heated ambient temperature sensing thin film resistors formed at an thin film ambient temperature sensing resistor forming part on said substrate; and a plurality of thin film electrode terminals, formed at a supporting part of said substrate at which said substrate is supported by a support member and which represents a part of said substrate excluding said thin film heated resistor forming part and said thin film ambient temperature sensing resistor forming part, for taking out electrical signals from said heated resistors and said non-heated ambient temperature sensing resistors, wherein said thin film heated resistor forming part and said thin film ambient temperature sensing resistor forming part of said substrate are shifted with respect to each other and arranged in front and behind in the direction of an air flow, and are shifted with respect to each other and arranged on the left and the right in a direction perpendicular to the direction of said air flow so that said pair of heated resistors and said pair of non-heated resistors do not overlap each other in a viewing direction parallel to the direction of said air flow; and said supporting part is allocated at one end of said substrate, at which said plurality of thin film electrode terminals are formed.

2. A measuring element for a mass air flow sensor according to claim 1, wherein a slit is provided in said substrate between said thin film heated resistor forming part and said thin film non-heated ambient temperature sensing resistor forming part.

3. A measuring element for a mass air flow sensor according to claim 2, wherein said slit is extended to said supporting part of said substrate.

4. A measuring element for a mass air flow sensor according to claim 1, wherein one electrode terminal is commonly connected to a pair composed of a heated resistor and a non-heated ambient temperature sensing resistor, and another electrode terminal is commonly connected to a pair composed of another heated resistor and another non-heated ambient temperature sensing resistor, among said plurality of electrode terminals.

5. A measuring element for a mass air flow sensor according to claim 1, wherein said heated resistors and said non-heated ambient temperature sensing resistors are formed by using the same material and by the same production process under the same processing conditions.

6. A measuring element for a mass air flow sensor according to claim 1, wherein said heated resistor are each composed of a film pattern in which the nearer to a center line between said heated resistors a part of the pattern is, the smaller a resistance value per a unit area of the pattern becomes.

7. A measuring element for a mass air flow sensor according to claim 1, wherein said non-heated ambient temperature sensing resistors are each composed of a pair of thin film patterns which extend together on adjacent paths so as to be formed in almost the same local shape at the same position in said thin film ambient temperature sensing resistor forming part.

8. A measuring element for a mass air flow sensor according to claim 7, wherein a resistance value per unit area of each a part of said pair of thin film patterns decreases, as said part is more distant from said supporting part.

9. A mass air flow sensor including said measuring element according to one of claims 1–8.

* * * * *